Charles M. Fields INVENTOR.

Patented Oct. 20, 1936

2,057,674

UNITED STATES PATENT OFFICE 2,057,674

POLYMERIZATION PROCESS

Charles M. Fields, Arlington, N. J., assignor, by mesne assignments, to E. I. du Pont de Nemours & Company, Wilmington, Del., a corporation of Delaware Application June 26, 1935, Serial No. 28,404

12 Claims. (Cl. 18—55)

This invention relates to a polymerization process and, more particularly, to a process of polymerizing polymerizable organic compounds in elongated shapes such as rods, tubes, and the like.

The polymerization of certain organic liquid compounds into rods, tubes, blocks, and other primary shapes from which articles may be fabricated by machining processes, as well as the polymerization of such compounds in finished shapes, is known. This invention relates to improvements in such processes where applied to organic compounds that are polymerizable to at least fairly hard solid shapes suitable for use as "turnery resins" and which involve, in the polymerization reaction, the factors of exothermicity and shrinkage; the term "polymerizable organic compound" as used throughout the specification is intended to mean a compound of this character.

An object of this invention is to provide a simple and economical process of producing flawless objects of polymerized organic compounds in elongated shapes. A further object is to provide such a process wherein molds of simple light construction may be used and which does not involve the use of heavy pressures. Other objects of the invention will be apparent from the description given hereinafter.

The above objects are accomplished according to the present invention by introducing a liquid composition containing a substantial amount of a monomeric polymerizable organic compound into an elongated mold closed at one end, and preferably with moderate pressure applied by means of a fluid on the opposite end of the body of liquid, applying heat to a narrow zone at the closed end of the mold until the monomeric compound in that zone is substantially polymerized, and progressively advancing the heating zone along the major axis of the mold at about the rate at which the monomeric compound in the mold is being polymerized while maintaining the temperature of the liquid composition ahead of the advancing heated zone at a temperature below that at which the monomer contained therein will undergo active polymerization.

The type of compound under consideration is readily polymerizable, either in the presence or absence of a polymerization catalyst, upon application of heat, to a relatively hard, solid body but this reaction is strongly exothermic and involves appreciable shrinkage, i. e., the solid polymer is denser than the liquid monomer. Because of these factors, the polymerization of the monomeric compound in molds, a species of casting rather than heat-pressure molding, to give a flawless product of the full cross section of the mold, has involved great difficulty.

It has now been discovered that, by disposing the polymerizable liquid organic compound in an elongated mold with one end closed, said mold either being held in vertical position with the closed end down or moderate pressure exerted on the body of the liquid, preferably by means of a fluid, from the opposite end of the mold, or both, and applying heat to a narrow zone at the closed end of the mold until the portion of polymerizable compound in that narrow zone of the mold is substantially polymerized, and then advancing the heating zone along the mold at about the rate of polymerization of the liquid within the mold, while keeping the liquid in advance of the heating zone below the temperature at which the monomer contained therein will undergo active polymerization, the troubles heretofore encountered through shrinkage and building up of local areas of excessive temperature are overcome and a flawless elongated body of polymerized compound is obtained.

One important reason for the operativeness of the present process is the fact that the polymerizable organic compounds under consideration may be polymerized rapidly, without the development of flaws due to local areas of excessive temperature or other reasons, providing the polymerization reaction is confined to a narrow zone or layer. In applicant's process the active polymerization reaction is confined to a narrow zone or layer because at the start of the process only a very shallow zone or layer of liquid is undergoing the polymerization reaction at the closed end of the mold and, as the heating zone is advanced along the major axis of the mold at about the rate of polymerization of the monomeric organic compound, there is still only a narrow zone or layer of liquid undergoing the polymerization reaction at any particular moment because the composition appreciably behind the point to which the heating zone has progressed, is polymerized at least to the extent where the reaction is no longer active and strongly exothermic, while the liquid composition appreciably ahead of such point is at a temperature below that at which the monomeric compound will undergo active polymerization.

Referring to the drawing forming a part of the present specification:

Like reference numerals refer to like parts in the various figures of the drawing.

Figure 1:
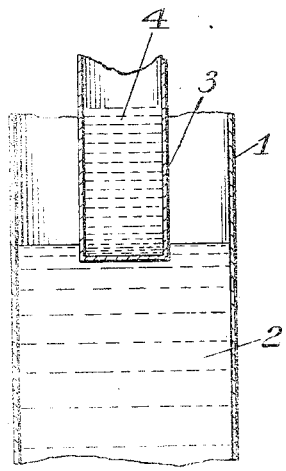
Fig. 1 is a more or less diagrammatic vertical section through one form of apparatus adapted to carry out the present invention, parts being broken away at the top and bottom of the apparatus; the elements of the apparatus being shown in their relative positions at the initial stage of the process.
Figure 2:
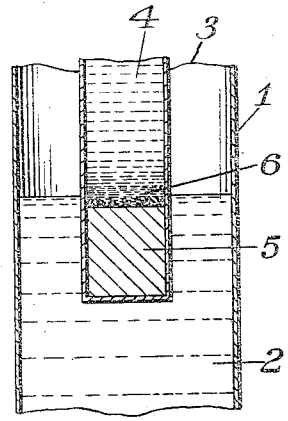
Fig. 2 is a view similar to Fig. 1 but illustrating the relative positions of the elements of the apparatus at an intermediate stage of the process.

In Figs. 1 and 2, reference numeral 1 indicates a section of an elongated vessel containing the heating liquid 2, usually water. Within the vessel 1 is disposed the mold 3 containing the organic liquid 4 to be polymerized. Aluminum is a particularly advantageous metal to be used in the mold 3. Wrought aluminum in the form of standard seamless tubing functions particularly well as a mold for the casting of rods. Cast aluminum under some circumstances is less desirable because of roughness or porosity or because of a copper content but still is suitable.

The mold 3 is illustrated in Fig. 1 at its position at the initial stage of the process, the bottom end of the mold being just submerged in the heating liquid 2. In this position heat is communicated to a shallow layer of the polymerizable liquid 4 causing it to polymerize while the liquid above said layer remains relatively cool and does not undergo active polymerization. If desired, a cooling fluid may be circulated around the mold 3 above the surface of the liquid 2 to insure the maintenance of the liquid 4 above the heated layer at a temperature below that at which it will polymerize. Except in molding shapes of quite large cross section, it has been found that usually appreciable polymerization does not take place above the shallow layer being directly heated and undergoing active polymerization, to an extent sufficient to cause trouble in this form of apparatus even though the upper portion of the mold 3 is merely cooled by air at room temperature.

In Fig. 2, the relative position of mold 3 and liquid 2 is shown at a point where the process has advanced sufficiently for a considerable section of the polymerizable liquid to become polymerized to a solid as indicated at 5. Active polymerization of the liquid 4 is taking place in a shallow layer indicated at 6. The drawing is merely diagrammatic and it should be understood that there is no exact dividing line between the solid polymer 5 and the liquid undergoing polymerization at 6 but there is a fairly well defined shallow layer 6 between the solid polymer no longer actively undergoing polymerization and the polymerizable liquid above which has not yet been heated sufficiently to initiate active polymerization.

In carrying out the process the mold 3 may be lowered into the heating liquid 2 or the level of the liquid 2 may be slowly raised while the mold 3 is held stationary. Likewise, the relative movement between liquid 2 and mold 3 may be continuous or step by step. That is, the level of the liquid 2 may be continuously raised at about the rate the organic liquid 4 is being converted into solid polymer or the level raised a short distance all at once and then held stationary until the liquid 4 in the shallow layer directly heated by the raised level of the liquid 2 is polymerized, and the liquid 2 again raised a short distance all at once. Depending upon the method of operation, the layer of liquid 4 undergoing active polymerization may be slightly in advance of the level of the liquid 2 or may lag behind it slightly. In any event, the level of the heating liquid must not be advanced along the major axis of the mold at such a rapid rate that the layer of polymerizable liquid undergoing active polymerization is so deep that excessive heat in the polymerizing layer develops and flaws result. The maximum safe rate of advancing the heating zone along the major axis of the mold will be dependent upon the cross section of the mold, the particular organic liquid being polymerized, temperature of the heating fluid, and the like. Obviously, in commercial operations preliminary tests will be made to determine the maximum safe rate which can be used under any particular set of conditions.

Once the polymerizable liquid has been converted into a solid so that active polymerization capable of developing an appreciable amount of heat is over, additional heat does not harm it and, in fact, is advantageous in assuring complete polymerization and maximum hardness of the polymer. For this reason, it is not necessary to arrange the heating means so that the polymerized material passes out of it within any definite time limit, although this can be done if desired. In the apparatus shown in Figs. 1 and 2, the polymer at the bottom of the mold is exposed to heat longer than that at the top of the mold; as a result, it may be that the polymer at the bottom is harder, in which case the whole mold may be subjected to additional heating after the active polymerization process proper is complete, in order to obtain a uniformly hard product. This subsequent heating treatment may take place while the polymerized material is still in the mold or subsequent to its removal from the mold. It is preferred to give this subsequent heating treatment while the polymer is still in the mold as it effects a very slight shrinkage in the polymer which simplifies removal from the mold.

It is preferred to subject the contents of the mold to moderate pressure during the process. A pressure ranging from 50 pounds to 300 pounds to the square inch is suitable for the purpose. This pressure, through its molding action upon the plastic or highly viscous material in the layer undergoing active polymerization, supplements the natural effect of gravity in keeping the mass compacted so that shrinkage flaws do not develop, and this increases the allowable height and thickness of the polymerizing layer and thereby the allowable rate of vertical advance of the heating zone. Also, this pressure opposes the development of bubbles by heat within the mass and thereby increases the feasible rate of production through permitting operation at higher temperatures and under a wider range of catalytic influence. In carrying out the process in horizontally disposed molds it is necessary to subject the contents of the mold to pressure in order to keep the mass compacted and avoid shrinkage flaws.

Conveniently, pressure is exercised upon the contents of the mold by closing the top of same with a cap carrying a tube which is connected to a source of gas pressure, i. e., a tank of compressed nitrogen or other inert gas.

Figure 3:
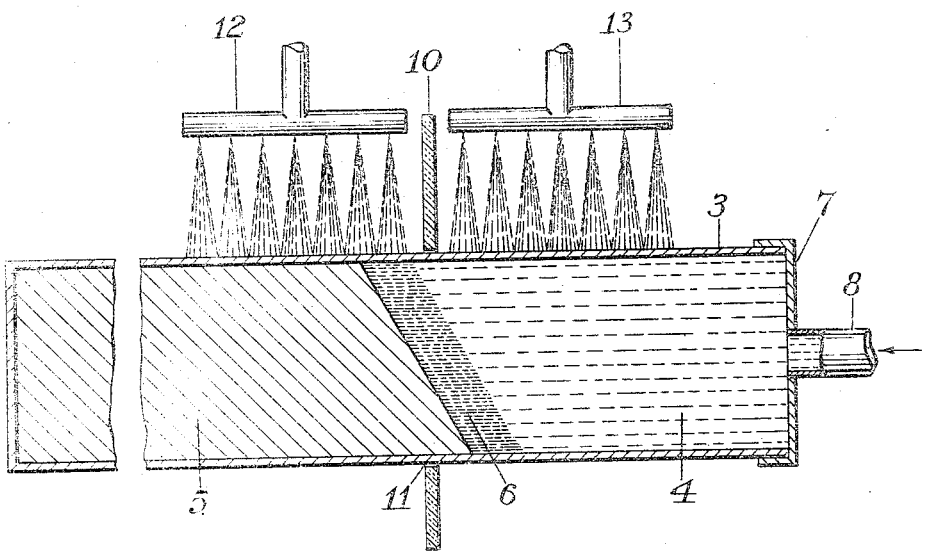
Fig. 3 is a more or less diagrammatic vertical section through an alternate form of apparatus designed to carry out the present invention, parts being broken away at the left end of the apparatus as illustrated; the elements of the apparatus being shown in their relative position at an intermediate state of the process.

Referring to Fig. 3 of the drawing, there is illustrated an alternative form of apparatus for carrying out the present invention wherein the polymerizable liquid 4 is placed in the mold 3 disposed horizontally with respect to its major axis. The mold 3 is provided with a cap 7 carrying the tube 8. The tube 8 communicates with a source of the polymerizable liquid not illustrated, which in turn is connected to a tank of inert gas under pressure so that the polymerizable liquid is forced into the tube in the direction of the arrow and completely fills the mold 3 and is maintained there under pressure. In this apparatus an insulating screen 10 is employed and the mold 3 is passed through the hole 11 in the screen 10. Disposed on each side of the screen 10 are the sprays 12 and 13. Spray 12 sprays hot water on the mold 3 as it passes through the hole 11 in the direction of the arrow, while spray 13 sprays cold water on that portion of the mold on its side of the screen. By this arrangement the polymerization process described in connection with Figs. 1 and 2 can be carried out by passing the mold 3 slowly through the screen 10 in the direction of the arrow at the rate at which the polymerizable liquid 4 is being polymerized. Fig. 3 illustrates the apparatus at an intermediate stage in the process where a considerable proportion of the liquid 4 has been converted to the solid polymer 5 and a narrow layer 6 of the liquid is undergoing active polymerization.

In this form of apparatus, the effect of settling of the polymer tends to tilt the plane of the layer which is undergoing active polymerization out of perpendicular but this does not cause any objectionable results. It will be understood that when the process is carried out in this form of apparatus it is quite necessary to keep the contents of the mold 3 under some pressure in order to obtain a flawless polymer the full cross section of the mold.

From the description given of alternate forms of apparatus for carrying out the present invention, it will be understood that wide variations of the apparatus are possible. The heating means could be in the form of coils, jackets, electrical means, and the like, as well as the bath and sprays illustrated. Likewise, the mold may be made of a wide variety of materials providing that the material selected is resistant to the corrosive action of the polymerizing liquid and does not inhibit the polymerizing reaction. Ordinarily, the mold will be made of metal and wrought aluminum has been found to be outstandingly the most suitable metal for this purpose.

The temperature to which the polymerizable liquid is heated in the shallow layer to be polymerized will be chosen as suitable for the particular liquid in question under the conditions of pressure and cross sectional dimensions of the mold employed. Normally, a temperature will be selected high enough to permit polymerization at an economical speed but not so high as to involve risk of overheating. Since the polymerization reaction is exothermic, the water bath or other heating medium to which the mold is subjected, may serve not only to provide the heat which initiates the polymerization reaction but also to prevent overheating by absorbing heat liberated within the polymerizing material.

The process of the present invention is applicable to polymerizable organic liquids generally where the polymerization reaction involves serious factors of exothermicity and shrinkage.
In the following list are given some of the organic polymerizable materials suitable for use in this process:

Methyl methacrylate
Ethyl methacrylate
Butyl methacrylate
Isobutyl methacrylate
Secondary butyl
  methacrylate
Tertiary amyl methacrylate
Phenyl methacrylate
Glycol monomethacrylate
Glycol dimethacrylate
Cyclohexyl methacrylate
Para-cyclohexylphenyl
  methacrylate
Decahydro-beta-naphthol methacrylate
Di-isopropyl carbinol
  methacrylate Furfuryl methacrylate
Tetrahydrofurfuryl
  methacrylate
Methacrylonitrile
Styrene
Alpha methyl styrene
Divinyl benzene
Vinyl acetate
Vinyl acetate-vinyl
  chloride
Vinyl butyrate
Vinyl chlorobenzene
Vinyl naphthalene
Vinyl ethinyl carbinol
Methyl vinyl ketone
Ethyl methylene
  malonate
Dimethyl itaconate
Dimethyl acetylene Interpolymers may also be used.

Since the primary purpose of the present invention is the manufacture of turnery shapes, it will be evident that the process will not ordinarily be applied to the polymerization of the softer resins not generally used for turnery purposes. Among such resins may be mentioned:

Methyl acrylate
    Ethyl acrylate
    Butyl acrylate
    Diethyl fumarate
    Diethyl maleate
    Divinyl ether It is to be understood, however, that the present process is applicable to these softer resins and, in some instances, it is highly desirable to polymerize these resins in elongated shapes.

It is to be understood that coloring matter, either soluble or insoluble, plasticizers, and the like, may be mixed in the liquids to be polymerized. Likewise, polymerization catalysts, such as benzoyl peroxide. In the selection and use of these various modifying agents, catalysts, and the like, due consideration must be given to the properties desired in the finished polymer. Where a polymer is to be used for turnery purposes, generally plasticizers are unnecessary or even undesirable. Likewise, since many of these liquids polymerize to brilliantly clear solids, and one of their most desirable properties is this clearness, care must be taken in introducing modifying agents, catalysts, and the like, so as not to cause haziness. The precautions necessary will be readily understood by those skilled in the art.

It is quite advantageous to employ instead of a polymerizable organic liquid substantially completely in monomeric form, a syrup of the polymer dissolved in the monomer. Such syrup can be obtained by partially polymerizing the monomer prior to introduction into the mold or by deliberately dissolving fully polymerized material in monomer. The use of these syrups, of the highest viscosity that can be conveniently poured into the molds, is preferred. The use of these syrups of polymer dissolved in monomer increases the speed and smoothness of the process, inasmuch as active polymerization of the material upon heating is induced more quickly. Also, the high viscosity of these syrups strongly tends to prevent the development of convection currents which carry the heated material away from the layer undergoing active polymerization into the layers above and thus make it difficult to maintain the requisite demarkation between hot and cool zones, upon which the process depends.

In the following examples are given specific illustrations of the present invention:

*Example 1.*—Monomeric methyl methacrylate is maintained at a temperature of 80° C. for about 3 hours to obtain a syrup of polymerized methyl methacrylate dissolved in monomeric methyl methacrylate. This syrup at room temperature has about the viscosity of heavy molasses. 0.1% by weight of the syrup of benzoyl peroxide is thoroughly mixed into the syrup which is then loaded into a 36" length of seamless aluminum pipe of inside diameter 0.815". This aluminum pipe is capped at the bottom, filled with the syrup to a depth of 34", and a fitting placed on the top, which fitting connects through a valve to a container of nitrogen gas under pressure. The mold is fixed in vertical position and the lower end of the mold brought into contact with a water bath maintained at 75–80° C. and thereafter is accurately and steadily lowered into the water bath at a rate of 1.5" per hour so that immersion to a depth of 34" is completed in 22–23 hours. Throughout this treatment the contents of the mold are kept under a pressure of about 175 pounds per square inch supplied by the compressed nitrogen.

At the end of the treatment, the application of pressure is discontinued, the mold detached from its fittings, removed from the hot water and cooled. The solid polymer is readily ejected from the mold and is in the form of a homogeneous, flawless, glassy rod.

*Example 2.*—The procedure of Example 1 was carried out except that the temperature of the water bath was 84° C., the pressure applied to the contents of the mold 250 pounds per square inch and the rate of immersion of the mold 2" per hour, said immersion being obtained by raising the level of the water bath while the mold was held stationary. The mold was cooled by a fine spray of cold water just above the hot water to maintain a very narrow zone of material undergoing active polymerization. As in Example 1, a homogeneous, flawless, glassy rod of polymerized methyl methacrylate was obtained.

The removal of the polymerized mass from an untapered pipe mold is not difficult and is accomplished by gently hammering. A readier release is achieved, however, by chilling the hot molds and contents which appears to cause a slight contraction of the metal mold sufficient to exert a pressure which decreases slightly the diameter of the solid polymer within, said polymer still being at a temperature which gives it a slight degree of plasticity. This much of the easing of the fit is achieved by a very brief chilling; continued chilling for some minutes causes a thermal shrinkage of the polymer which contributes further to a loosening of the mold. This is illustrated in Example 3.

*Example 3.*—At the end of the polymerization step in Example 1, the mold is removed from the hot water bath and immersed in ice water for 20 minutes. It is then removed and inverted, whereupon the rod of polymerized methyl methacrylate drops out freely.

In the following example is illustrated the process without the use of pressure:

*Example 4.*—A partially polymerized syrup of methyl methacrylate, as in Example 1, is loaded into an aluminum pipe mold, the open top end of which is then covered to prevent entrance of dust. The mold is lowered vertically at the rate of 0.4" per hour into a bath maintained at 80° C. The mold is cooled by a fine spray of cold water just above the hot water to maintain a very narrow zone of material undergoing active polymerization. Removal of the solid polymer from the mold is then effected as in Example 1.

*Example 5.*—Styrol containing 0.1% benzoyl peroxide is heated gently until it has thickened to a syrup having at room temperature a viscosity about equal to that of molasses. This syrup at room temperature is then poured into a mold as in Example 1 and is polymerized from the bottom by immersion of the mold vertically downward into an oil bath maintained at 120° C. at the rate of 1" per hour. The solid polymer is removed from the mold as in Example 1.

*Example 6.*—A seamless wrought aluminum pipe 36" long and of inside diameter of .490" and outside diameter of .675" is capped at one end. Its other end is connected to a reservoir supply of methyl methacrylate syrup prepared as in Example 1 and containing 0.1% benzoyl peroxide, and the reservoir is fitted to be put under pressure supplied by nitrogen gas. The pipe, constituting the mold, is disposed in horizontal position and is filled from the reservoir, the pipe being tilted then for long enough for the escape of trapped air.

A pressure of 75 pounds per square inch is then applied to the contents of the reservoir and mold and the capped end of the mold is heated by a spray of water at 75° C. while the remainder of the length of the mold is kept cool by a spray of water at 15° C. The hot and cold sprays are separated from each other by an insulating screen as illustrated in Fig. 3. The mold is moved into the heating zone at a rate of 1" per hour so that the full length of the pipe is treated at the expiration of 36 hours. The pipe is then disconnected from the reservoir and the polymerized material removed from it in the form of a flawless rod.

In the above examples, a polymerization catalyst was employed. Nevertheless, the present process may be readily carried out in the absence of such catalysts, although this is not quite so desirable, since it has been found that when no catalyst is used there is a strong tendency toward the development of voids and bubbles in the solid polymer and, accordingly, in order to prevent their development, it is necessary to operate more slowly or under a higher pressure. As will be understood by those skilled in the art, the process may be conducted with the assistance of any of the known polymerization catalysts which will not interfere with the appearance or impair the quality of the product. Benzoyl peroxide is preferred because it can be used in appreciable amounts without affecting the clearness and transparency of the solid polymer.

The process of the present invention may be employed for the polymerization of polymerizable organic compounds in elongated shapes for use in turnery operations, and the like.

An advantage of the present invention is that it provides a simple and economical means for producing flawless turnery shapes from polymerizable organic compounds of a type which heretofore have entered this field in only a limited way because of the difficulties resulting from the exothermicity of their polymerization reactions and from the shrinkage accompanying their polymerization. A further advantage of the present invention is that it can be carried out readily with simple and inexpensive equipment and control of the temperature involved in the process can be easily put upon an automatic basis. If pressure is used in the present process it is of a low order and, accordingly, the process does not involve the massive, cumbersome equipment needed in high pressure processes.

As many apparently widely different embodiments of this invention may be made without departing from the spirit and scope thereof, it is to be understood that the invention is not limited to the specific embodiments thereof except as defined in the appended claims.

I claim:

1. Process of polymerizing a liquid composition comprising a monomeric polymerizable organic compound, in elongated shapes which comprises introducing a substantial volume of the liquid composition into an elongated mold closed at one end, applying heat to a narrow zone at the closed end of the mold until the monomeric compound in that zone is substantially polymerized, and progressively advancing the heating zone along the major axis of the mold at about the rate at which the monomeric compound in the mold is being polymerized while maintaining the liquid composition ahead of the advancing heating zone at a temperature below that at which the monomeric compound will undergo active polymerization.

2. Process of polymerizing a liquid composition comprising a monomeric polymerizable organic compound, in elongated shapes which comprises introducing a substantial volume of the liquid composition into an elongated mold closed at one end, exerting pressure on the body of liquid composition by means of a fluid from the opposite end of the mold, applying heat to a narrow zone at the closed end of the mold until the monomeric compound in that zone is substantially polymerized, and progressively advancing the heating zone along the major axis of the mold at about the rate at which the monomeric compound in the mold is being polymerized while maintaining the liquid composition ahead of the advancing heating zone at a temperature below that at which the monomeric compound will undergo active polymerization.

3. Process of polymerizing a liquid composition comprising a monomeric polymerizable organic compound, in elongated shapes which comprises introducing a substantial volume of the liquid composition into an elongated mold closed at one end, vertically introducing the mold, closed end down, into a liquid bath at a temperature sufficient to induce polymerization of the monomeric compound, and progressively advancing the level of the liquid bath up the vertically positioned mold at approximately the rate at which the monomeric compound is being polymerized while maintaining the liquid composition above the level of the liquid bath at a temperature below that at which the monomeric compound will undergo active polymerization.

4. Process of polymerizing a liquid composition comprising a monomeric polymerizable organic compound, in elongated shapes which comprises introducing a substantial volume of the liquid composition into an elongated mold closed at one end, exerting pressure on the body of liquid composition by means of a fluid from the opposite end of the mold, vertically introducing the mold, closed end down, into a liquid bath at a temperature sufficient to induce polymerization of the monomeric compound, and progressively advancing the level of the liquid bath up the vertically positioned mold at approximately the rate at which the monomeric compound is being polymerized while maintaining the liquid composition above the level of the liquid bath at a temperature below that at which the monomeric compound will undergo active polymerization.

5. Process of polymerizing a liquid composition comprising a monomeric polymerizable organic compound, in elongated shapes which comprises introducing a substantial volume of the liquid composition into an elongated mold closed at one end, vertically introducing the mold, closed end down, into a liquid bath at a temperature sufficient to induce polymerization of the monomeric compound, and progressively lowering the mold into said liquid bath so that the level of the liquid bath advances up the vertically positioned mold at about the rate at which the monomeric compound is being polymerized while maintaining the liquid composition above the level of the liquid bath at a temperature below that at which the monomeric compound will undergo active polymerization.

6. Process of polymerizing a liquid composition comprising a monomeric polymerizable organic compound, in elongated shapes which comprises introducing a substantial volume of the liquid composition into an elongated mold closed at one end, exerting pressure on the body of liquid composition by means of a fluid from the opposite end of the mold, vertically introducing the mold, closed end down, into a liquid bath at a temperature sufficient to induce polymerization of the monomeric compound, and progressively lowering the mold into said liquid bath so that the level of the liquid bath advances up the vertically positioned mold at about the rate at which the monomeric compound is being polymerized while maintaining the liquid composition above the level of the liquid bath at a temperature below that at which the monomeric compound will undergo active polymerization.

7. Process of polymerizing a liquid composition comprising a monomeric polymerizable organic compound, in elongated shapes which comprises introducing a substantial volume of the liquid composition into an elongated mold closed at one end, exerting pressure on the body of liquid composition by means of a fluid from the opposite end of the mold, disposing said mold with its major axis horizontal, spraying a narrow zone at the closed end of the mold with a liquid at a temperature sufficient to induce polymerization of the monomeric compound, until the monomeric compound in that zone is substantially polymerized, and progressively advancing the heating zone along the major axis of the mold at about the rate at which the monomeric compound in the mold is being polymerized while maintaining the liquid composition ahead of the advancing heating zone at a temperature below that at which the monomeric compound will undergo active polymerization.

8. Process of polymerizing a syrup of a polymeric mono-methacrylic acid ester dissolved in monomeric methacrylic acid ester, in elongated shapes which comprises introducing a substantial volume of the syrup into an elongated mold closed at one end, exerting pressure on the body of syrup by means of a fluid from the opposite end of the mold, applying heat to a narrow zone at the closed end of the mold until the monomeric ester in that zone is substantially polymerized, and progressively advancing the heating zone along the major axis of the mold at about the rate at which the monomeric ester in the mold is being polymerized while maintaining the syrup ahead of the advancing heating zone at a temperature below that at which the monomeric ester will undergo active polymerization.

9. Process of polymerizing a syrup of polymeric methyl methacrylate dissolved in monomeric methyl methacrylate, in elongated shapes which comprises introducing a substantial volume of the syrup into an elongated mold closed at one end, exerting pressure on the body of the syrup by means of a fluid from the opposite end of the mold, applying heat to a narrow zone at the closed end of the mold until the monomeric methyl methacrylate in that zone is substantially polymerized, and progressively advancing the heating zone along the major axis of the mold at about the rate at which the monomeric methyl methacrylate in the mold is being polymerized while maintaining the syrup ahead of the advancing heating zone at a temperature below that at which the monomeric methyl methacrylate will undergo active polymerization.

10. Process of polymerizing a liquid composition comprising monomeric methyl methacrylate, in elongated shapes which comprises introducing a substantial volume of the liquid composition into an elongated mold closed at one end, applying heat to a narrow zone at the closed end of the mold until the monomeric methyl methacrylate in that zone is substantially polymerized, and progressively advancing the heating zone along the major axis of the mold at about the rate at which the monomeric methyl methacrylate in the mold is being polymerized while maintaining the liquid composition ahead of the advancing heating zone at a temperature below that at which the monomeric methyl methacrylate will undergo active polymerization.

11. Process of polymerizing a liquid composition comprising monomeric methyl methacrylate, in elongated shapes which comprises introducing a substantial volume of the liquid composition into an elongated mold closed at one end, exerting pressure on the body of liquid composition by means of a fluid from the opposite end of the mold, applying heat to a narrow zone at the closed end of the mold until the monomeric methyl methacrylate in that zone is substantially polymerized, and progressively advancing the heating zone along the major axis of the mold at about the rate at which the monomeric methyl methacrylate in the mold is being polymerized while maintaining the liquid composition ahead of the advancing heating zone at a temperature below that at which the monomeric methyl methacrylate will undergo active polymerization.

12. Process of polymerizing a liquid composition comprising a monomeric polymerizable organic compound, in elongated shapes which comprises introducing a substantial volume of the liquid composition into an elongated aluminum mold closed at one end, applying heat to a narrow zone at the closed end of the mold until the monomeric compound in that zone is substantially polymerized, and progressively advancing the heating zone along the major axis of the mold at about the rate at which the monomeric compound in the mold is being polymerized while maintaining the liquid composition ahead of the advancing heating zone at a temperature below that at which the monomeric compound will undergo active polymerization.

CHARLES M. FIELDS.

CERTIFICATE OF CORRECTION.

Patent No. 2,057,674. October 20, 1936

CHARLES M. FIELDS.

It is hereby certified that error appears in the printed specification of the above numbered patent requiring correction as follows: Page 2, second column, line 14, for the word "flows" read flaws; and that the said Letters Patent should be read with this correction therein that the same may conform to the record of the case in the Patent Office.

Signed and sealed this 29th day of December, A. D. 1936.

(Seal)

Henry Van Arsdale
Acting Commissioner of Patents.